United States Patent [19]

Stedman et al.

[11] 4,064,959
[45] Dec. 27, 1977

[54] STEERING ARRANGEMENT FOR A DOUBLE ARTICULATED WHEEL TRACTOR

[75] Inventors: Robert N. Stedman, Chillicothe; Gerald P. Simmons, Washington, both of Ill.

[73] Assignee: Caterpillar Tractor Co., Peoria, Ill.

[21] Appl. No.: 774,335

[22] Filed: Mar. 4, 1977

Related U.S. Application Data

[63] Continuation of Ser. No. 636,502, Dec. 1, 1975, abandoned.

[51] Int. Cl.² ............................................. B62D 5/06
[52] U.S. Cl. ..................................... 180/139; 180/51
[58] Field of Search ................ 180/51, 133, 134, 136, 180/139

[56] References Cited

U.S. PATENT DOCUMENTS

| | | | |
|---|---|---|---|
| 2,837,349 | 6/1958 | Hawk | 180/136 X |
| 3,302,742 | 2/1967 | Sunderlin | 180/139 |
| 3,305,039 | 2/1967 | Molby | 180/139 X |
| 3,367,437 | 2/1968 | Garrett | 180/139 X |
| 3,422,919 | 1/1969 | Molby | 180/139 |

FOREIGN PATENT DOCUMENTS

| | | | |
|---|---|---|---|
| 971,628 | 8/1969 | Canada | 180/139 |

*Primary Examiner*—Joseph F. Peters, Jr.
*Assistant Examiner*—Terrance L. Siemens
*Attorney, Agent, or Firm*—Wegner, Stellman, McCord, Wiles & Wood

[57] ABSTRACT

In a double articulated vehicle, such as for use in low clearance areas, i.e. mines with low ceilings and the like, front and rear frames are pivotally mounted relative to an intermediate carriage about spaced vertical axes. A link is pivotally mounted to the front and rear frames with the longitudinal axis of the link crossing the centerline of the vehicle. Rams are provided between the carriage and the front and rear frames so that actuation of the rams turns the front and rear frames simultaneously relative to the carriage.

16 Claims, 5 Drawing Figures

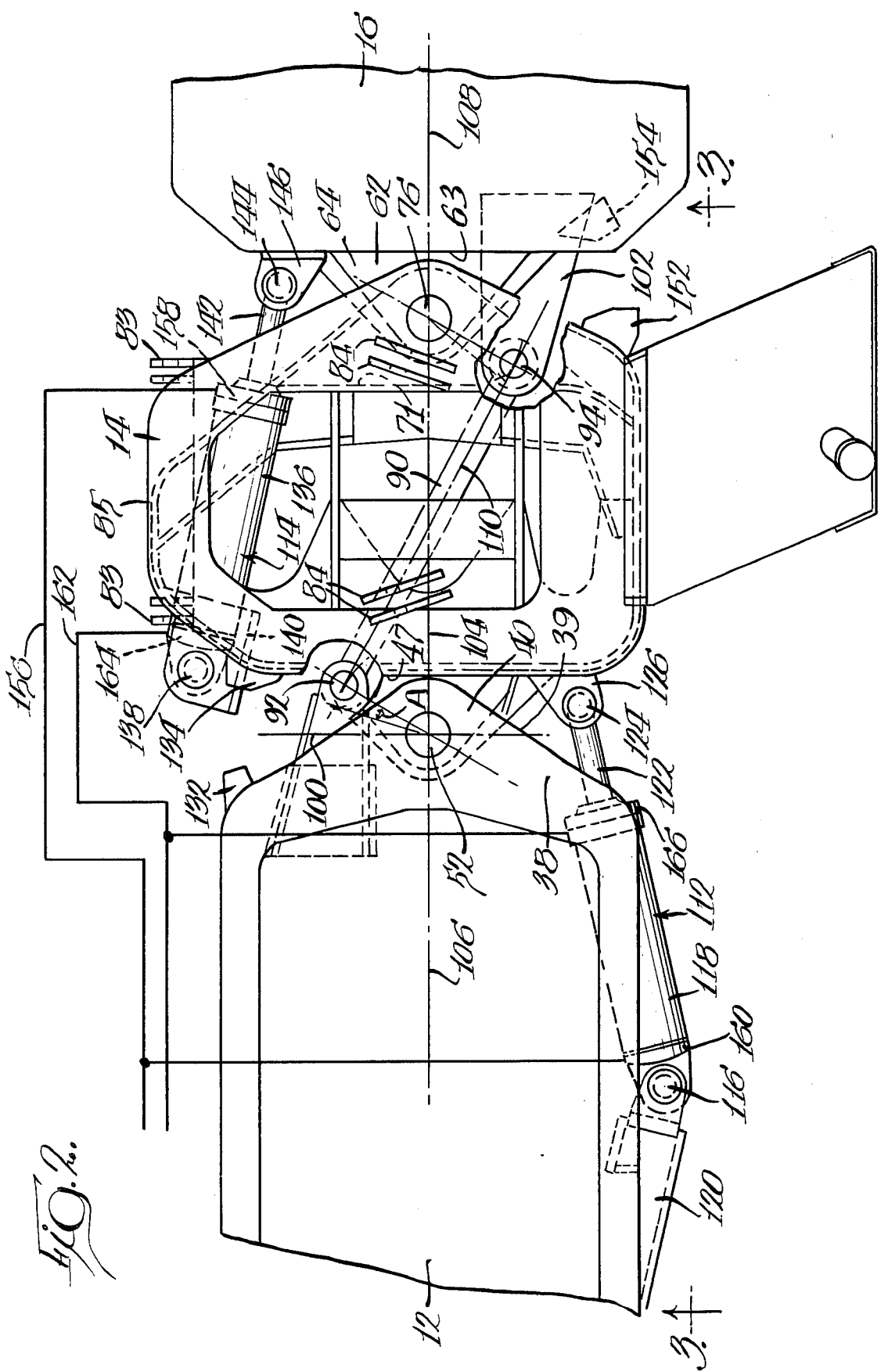

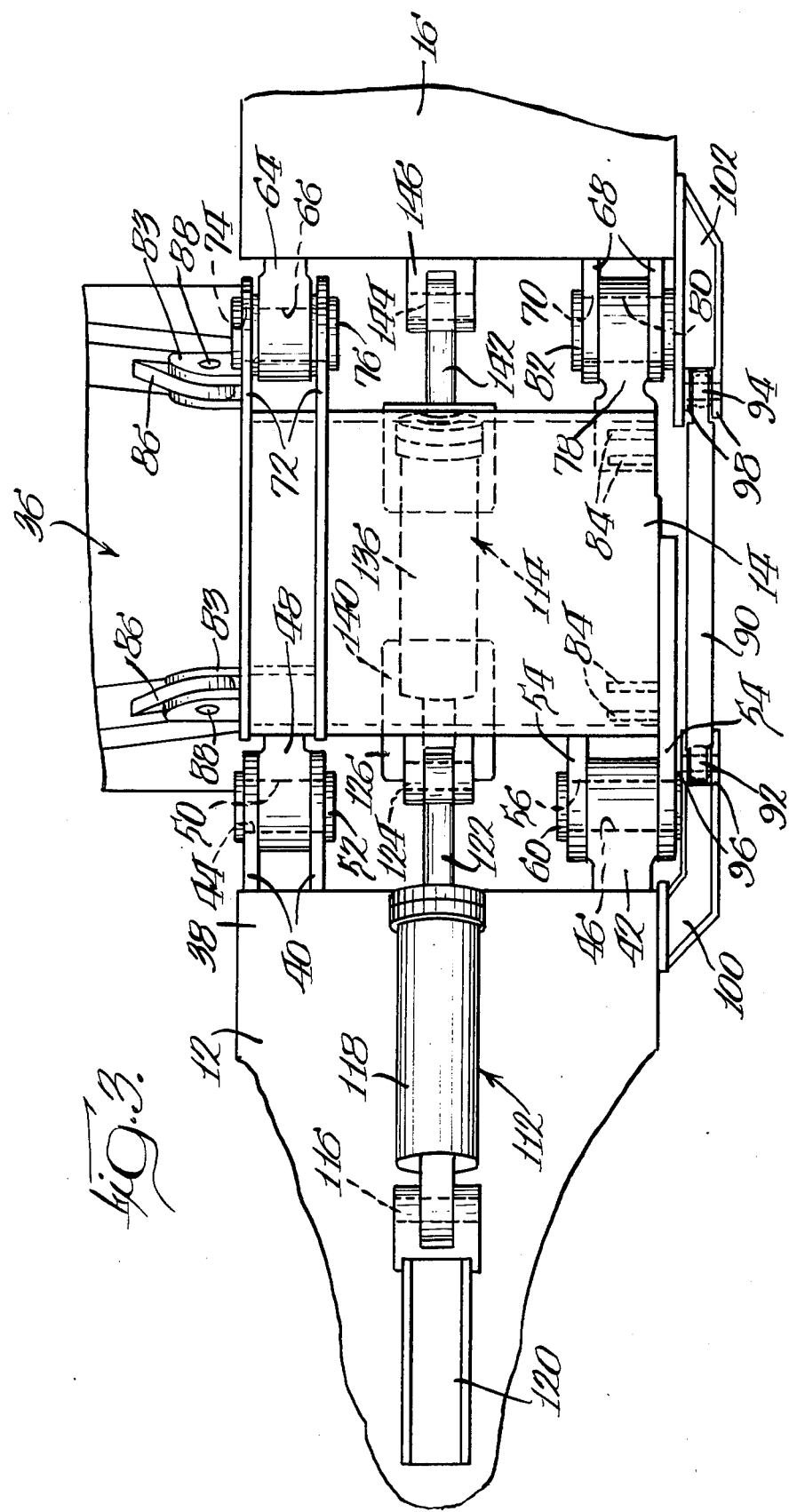

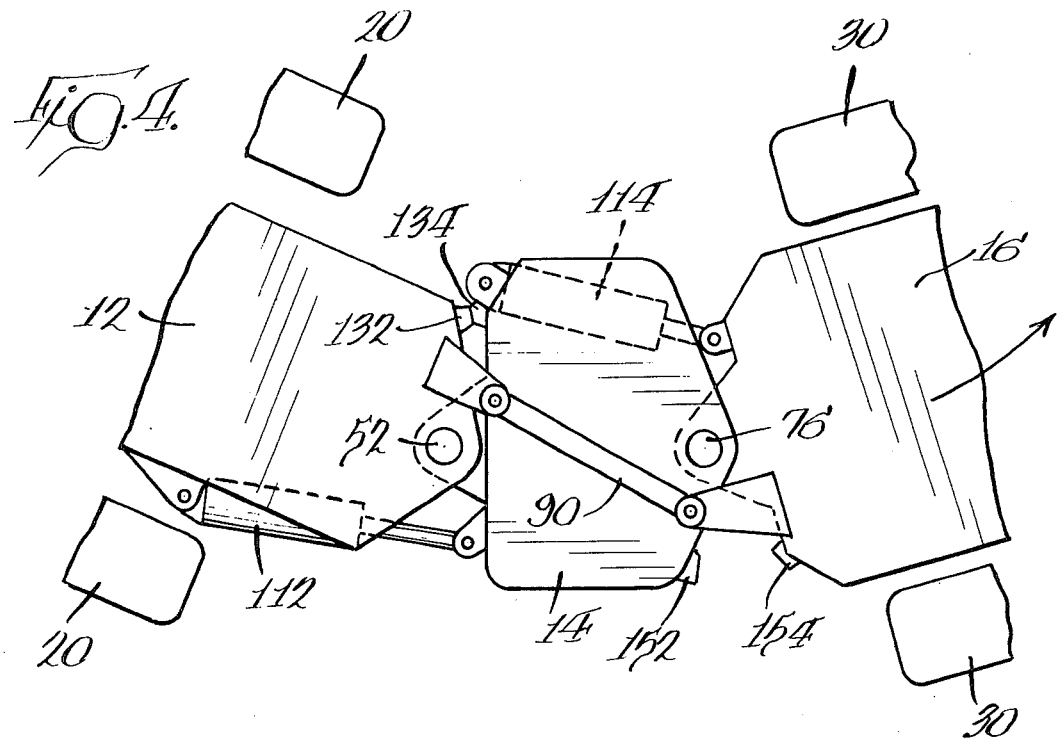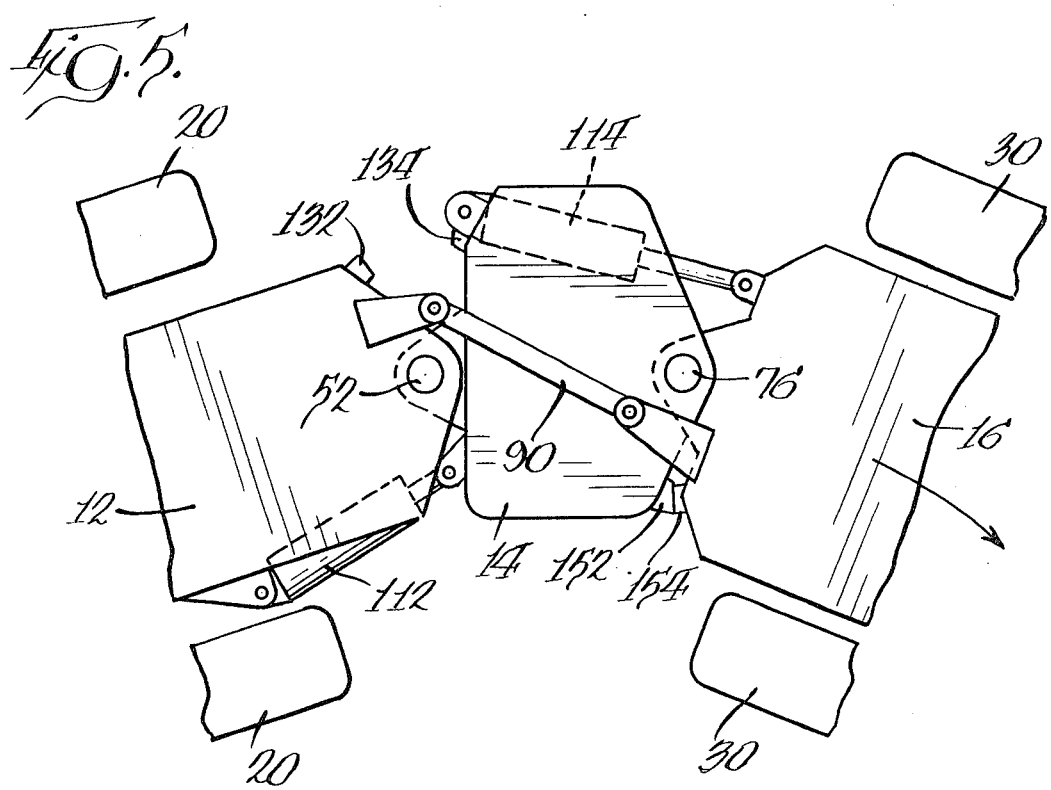

STEERING ARRANGEMENT FOR A DOUBLE ARTICULATED WHEEL TRACTOR

This is a continuation, of application Ser. No. 636,502 filed Dec. 1, 1975, now abandoned.

BACKGROUND OF THE INVENTION

1. Field of the Invention

This invention relates to material-handling vehicles and, more particularly, to a double articulated vehicle with means for interconnecting the steering of the front and rear frames.

2. Description of the Prior Art

Double articulated vehicles broadly have been known but have not been widely used. Possible reasons for the limited use could be due to the problems associated with the complex systems for controlling the steering of the vehicle. One such system provides for using a hydraulic cylinder having a rod which requires that the front wheels be tracked to align with the rear wheels. The rod is mounted on one side of the centerline of the vehicle and is connected to bell cranks on the front and rear frames such that the front wheels will always lie in a plane parallel to the plane of the wheels of the rear frame.

In another form of double articulated vehicle, two pairs of hydraulic rams are connected between the rear unit and a central unit and between the central unit and a front unit for steering the vehicle. Extendable follow-up valves are used to control the flow of hydraulic fluid to the rams for steering the front and rear units through equal angles. With the number of hydraulic rams, the hydraulic piping and the hydraulic valves and controls, the possibility of malfunction of one or more parts of the system is great, resulting in failure of the steering of the vehicle. Leaking of one ram is sufficient to cause failure of the system.

Another prior art device uses two pairs of hydraulic rams between the front, center and rear units with a follow-up extendable link diagonally connected between the front and rear units to sense and time the angular movement of the units. Once again, the number of cylinders, piping and controls are such that a failure or malfunction of one throws off the entire system resulting in loss of control of the steering of the vehicle.

SUMMARY OF THE INVENTION

A double articulated vehicle is provided with a steering arrangement operated from the center carriage of the vehicle. A rigid link interconnects the front and rear frames and crosses the longitudinal axis of the center carriage at an acute angle. An actuator ram connects the rear frame with the center carriage on one side of the longitudinal axis and another actuator ram connects the center carriage to the front frame on the other side of the longitudinal axis. Actuation of the rams will turn the vehicle in the desired direction. Failure of one of the rams will not cause failure of the steering of the vehicle since one ram and the link will function to turn the vehicle as desired.

BRIEF DESCRIPTION OF THE DRAWINGS

The details of construction and operation of the invention are more fully described with reference to the accompanying drawings which form a part hereof and in which like reference numerals refer to like parts throughout.

In the drawings:

FIG. 2 is an enlarged plan view, partially broken away, of the center carriage portion of the vehicle of FIG. 1 showing one embodiment of the invention in position;

FIG. 3 is an enlarged elevational view of the center carriage portion taken along the lines 3—3 of FIG. 2;

FIG. 4 is a schematic plan view of the center carriage portion with the steering in one extreme position; and, FIG. 5 is a schematic plan view of the center carriage portion with the steering in an opposite extreme position.

DESCRIPTION OF THE PREFERRED EMBODIMENT

Figure 1:
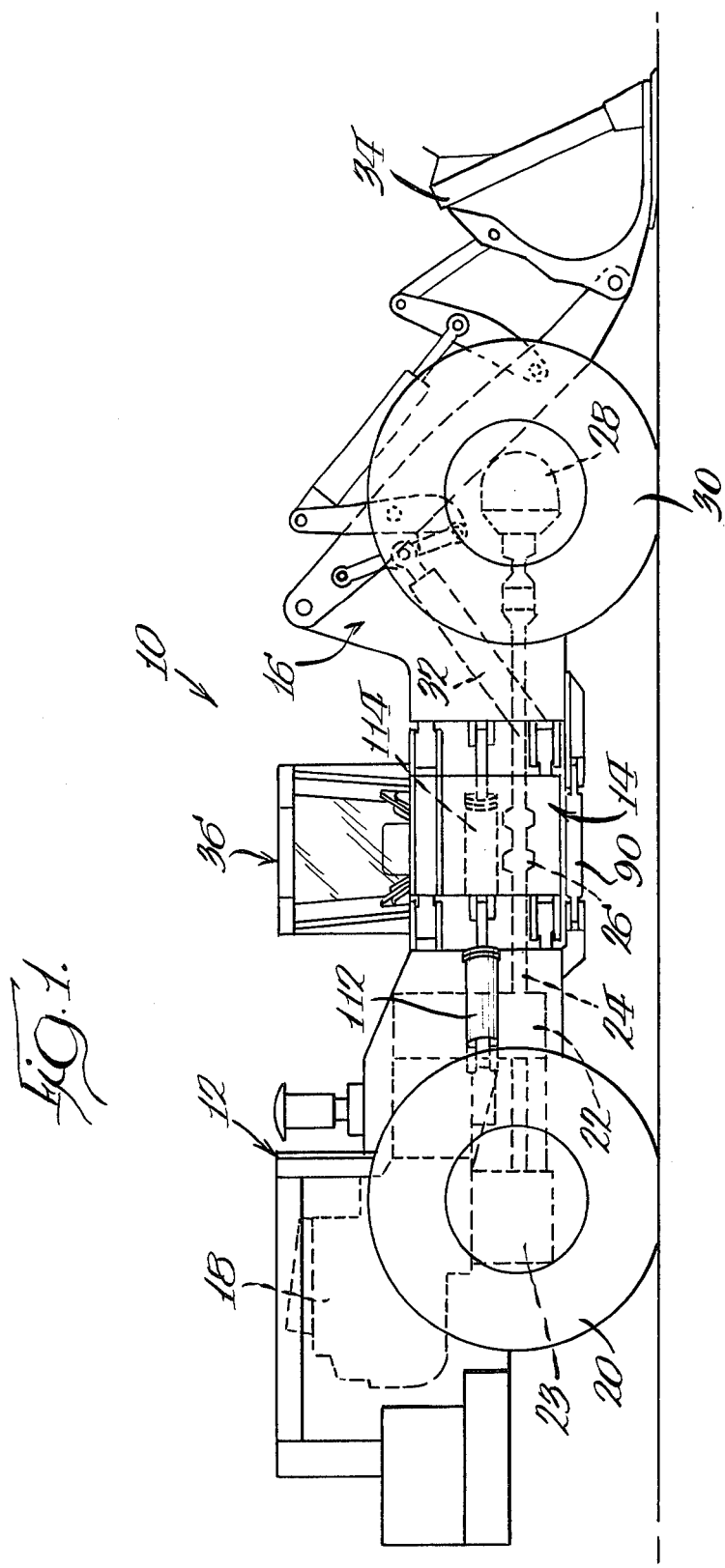
FIG. 1 is an elevational view of a double articulated vehicle, in particular a wheel loader, embodying the invention.

Referring to the drawings, and in particular to FIG. 1, a double articulated wheel loader-type vehicle 10 is illustrated and has a rear frame 12, a center or intermediate carriage 14 and a front frame 16. Although the vehicle shown is a wheel loader, it is understood that any vehicle that presently has a single articulated frame arrangement could be adapted for a double articulated arrangement along the lines hereinafter described. The rear frame 12 carries an engine 18 which drives a pair of wheels 20 through the usual transmission arrangement 22 and differential 23. A drive line 24 is driven from the transmission 22 and operates through flexible coupling arrangements 26 for transmitting drive from the rear frame 12 through the intermediate carriage 14 and to the differential 28 in the front frame 16. The differential 28 drives the front wheels 30. In the vehicle shown, a pair of hydraulic cylinders 32 (only one being shown) is used to actuate and operate a bucket arrangement 34.

The present vehicle was designed for operation in areas where relatively low overhead clearance is provided and, accordingly, a removable cab module 36 is mounted on the side of the center or intermediate carriage 14 with the operator of the vehicle facing in a direction transverse to the longitudinal axis of the vehicle. In this way, the operator is free to observe both forward and rearward portions of the vehicle with both the head of the operator and the top of the cab extending no higher than the plane containing the highest elements of the vehicle. The details and construction of the removable cab module form the subject matter of a separate co-pending application and the details of the construction and connection of the module will not be described herein.

Referring to FIGS. 2 and 3 of the drawings, the steering linkage for the vehicle is shown and described. That is, the rear frame 12 has a forwardly projecting portion 38 having a front wall 39, that is somewhat triangular in configuration when viewed from above, and has a pair of forwardly projecting, spaced apart flanges 40 carried by the upper half of said front portion of the frame 12 and has a single forwardly projecting flange 42 carried by the lower half of said front portion of the rear frame 12. The pair of flanges 40 and single flange 42 have vertically aligned apertures 44 and 46, respectively, therethrough. The center carriage 14 has a rear wall 47, which has in the upper half thereof, a single rearwardly projecting flange 48 which is adapted to be positioned between the pair of flanges 40 and has an aperture 50 which aligns with the apertures 44 in the flanges 40. A pivot pin or King pin 52 passes through the apertures 44 and 50 in the flanges 40 and 48, respectively. The lower half of the center carriage 14 has a pair of spaced apart, rearwardly projecting flanges 54 which engage on opposite sides of the single flange 42 with apertures 56 in the flanges 54 aligned with the aperture 46 in the flange 42. A separate pivot pin or king pin 60 passes through the aligned apertures 56 and 50 with the axis of the pin 60 aligned with the axis of the pin 52. The center carriage 14 articulates or pivots relative to the rear frame 12 about the axes of the pins 60 and 52.

The front frame 16 has a rear wall 63, which has in the upper half thereof, a rearwardly projecting single flange 64 with an aperture 66 therethrough. The lower half of the front frame 16 has a pair of spaced apart, rearwardly extending flanges 68 which have aligned apertures 70 therethrough, which apertures 70 are aligned with the aperture 66 in the flange 64. The center carriage 14 has a front wall 71 which has a pair of forwardly projecting flanges 72 in the upper half thereof, which flanges 72 have aligned apertures 74 therethrough. The flanges 72 are adapted to engage on opposite sides of the flange 64 with the apertures 74 aligned with the aperture 66. A pivot pin or king pin 76 is passed through the aligned apertures 74 and 66. The lower half of the center carriage 14 has a forwardly extending flange 78 which is adapted to nest between the flanges 72 and has an aperature 80 aligned with the apertures 70 with a pivot pin or king pin 82 passed therethrough. The axes of the pivot pins 76 and 82 are vertically aligned with each other so that the front frame 16 articulates or pivots relative to the center carriage 14 about the common axes of the pins 76 and 82.

The center carriage 14 has an opening through the midportion thereof to permit the passing therethrough of the drive line 24 from the engine 18 to the differential 28 of the front frame 16. Aside from the provision for permitting the drive line 24 to pass through the midportion of the center carriage 14, the details and construction of the drive line form no part of the present invention, and accordingly, will not be described in detail herein. The center carriage 14 has, on its top surface, two pairs of upwardly extending, parallel lugs 83 with two pairs of sidewardly extending, parallel lugs 84 carried on the left side wall 85 near the bottom thereof such that hangers 86 on the intermediate and lower portions of the cab 36 extend between the lugs 84 and 83 with pins 88 passing therethrough for securing the cab 36 on the side of the center carriage 14. The cab 36 is provided with the appropriate steering, braking and controlling mechanisms to make it possible for the operator seated in the cab to control the operation of the vehicle. It will be noted that the operator faces in a direction at right angles to the longitudinal axis of the vehicle, so that the operator will have excellent forward and rearward visibility for better control and operation of the function of the vehicle.

Mounted below and out of contact with the center carriage 14 is a rigid link 90 which is pivoted at each end by means of pivot pins 92 and 94 to a pair of spaced apart flanges 96 and 98 carried by brackets 100 and 102 mounted on the lower portions of the rear frame 12 and front frame 16, respectively. The rigid link 90 is not connected to the center carriage 14, but is pivotally mounted to the rear frame 12 on one side of the centerline 104 of the carriage 14 with the other end of the link 90 being pivotally mounted on the front frame 16 on the other side of the centerline 104 of the carriage 14. When the centerline 106 of the rear frame 12 and the centerline 108 of the front frame 16 are aligned with each other, they are also aligned with the centerline 104 of the center carriage 14 such that the vehicle is in condition for a straight forward or rearward movement. With the vehicle in said straight line condition, the vertical axis of the pivot pin 92 ideally lies in a vertical plane which contains the vertical axes of the aligned pivot pins 52 and 60, which vertical plane lies perpendicular to the centerline 110 of the link 90. Likewise, the vertical axis of the pivot pin 94 lies in a vertical plane which contains the vertical axes of the aligned pivot pins 76 and 82, which vertical plane also lies perpendicular to the centerline 110 of the link 90. The link 90 will tie the rear frame 12 to the front frame 16 so that any motion about the pivot pins 52, 60 of the rear frame 12 relative to the center carriage 14 will produce a like movement of the front frame 16 about the pivot pins 76 and 82 relative to the center carriage 14. The centerline 110 of the link 90 lies at an acute angle with respect to the centerline 104 of the center carriage 14. The pivot pin 92 is spaced from the axis of the pivot pins 52, 60 by an amount equal to the spacing of the axis of the pivot pin 94 from the axis of the pivot pins 76, 82. In this way, equal and opposite movements of one frame, i.e. the rear frame, will be transmitted to the front frame 16 through the rigid link 90 and vice versa.

A pair of hydraulic rams 112 and 114 are mounted between the rear frame 12 and center carriage 14 and the center carriage 14 and front frame 16, respectively. Specifically, hydraulic ram 112 is pivotally mounted to the rear frame 12 by means of pin 116 connecting the stationary portion 118 of the ram 112 to a bracket 120 secured to the side of the rear frame 12. The movable portion 122 of the ram 112 is pivotally connected at its outer end by means of pin 124 to a bracket 126 mounted on the rearward face of the intermediate or center carriage 14. As shown in FIG. 3, the ram 112 is positioned on the side of the carriage 14 and on the rear of the front frame 16 substantially midway between the flanges 40 and 42. A pair of mating stops or bumpers 132, 134 are mounted, respectively, on the rear frame 12 and center carriage 14 to the left of the centerline 104 of the vehicle. The stops 132 and 134 are positioned in such a way as to limit the amount of pivotal movement of the rear frame 12 relative to the center carriage 14 during a left turn by the vehicle.

Mounted on the opposite side of the vehicle from the ram 112 is the ram 114 which has the stationary portion 136 pivotally mounted to the rear portion of the center carriage 14 by means of pin 138 passing through bracket 140 carried by the center carriage 14. The ram 144 traverses the length of the center carriage 14 with the movable portion 142 of the ram 114 pivotally mounted by pivot 144 to the bracket 146 carried by the rear portion of the front frame 16. As shown in FIG. 3, the ram 114 is positioned substantially midway between the flanges 64 and 68. A pair of stops 152, 154 are mounted, respectively, on the center carriage 14 and on the front frame 16 and are aligned with each other in such a way that they will contact upon extreme relative movement between the front frame 16 and the center carriage 14 during right turns of the vehicle.

It should be noted that the hydraulic ram 112 is nested relatively close to the side of the rear frame 12 and is protected somewhat by the overhanging portions of the rear frame 12. Likewise, the hydraulic ram 114 is positioned within the confines of the center carriage 14, once again, so as to protect the ram from external blows or forces. The cab 36 is positioned in such a way on the center carriage 14 as to protect the ram 114. With the rams 112 and 114 protected the way they are within the confines of the rear frame 12 and center carriage 14 an with the rams 112 and 114 mounted generally centrally between the upper pivot pins 52, 76 and the lower pivot pins 60 and 82, a system for forces is provided between the rear frame 12 and the center carriage 14 and the front frame 16 so as to substantially reduce or eliminate twisting or torquing between the rear frame 12, center carriage 14 and front frame 16. Elongation or foreshortening of the movable portions 122, 142 of the rams 112 and 114, respectively, is applied between the rear frame 12 and the center carriage 14 centrally between the pin 52 and pin 60 and between the pin 76 and pin 82 so that the respective rear frame 12 and front frame 16 are pivoted relative to the center carriage 14 along the common axes of the respective pins 52, 60 and 76, 82.

In operation, the operator will turn the controls to turn the vehicle to the left, as shown in FIG. 2, which will elongate the ram 112 by forcing the movable portion 122 out of the cylinder 118 at the same time as the ram 114 is foreshortened by the movable portion 142 being drawn into the cylinder 136. The link 90, operating in conjunction with the rams 112 and 114, will pivot the rear frame 12 about the common axes through the pins 52, 60 relative to the center carriage 14 as the front frame 16 pivots about the common axes through the pins 76, 82 relative to the center carriage 14. The ram 112 will elongate and the ram 114 will foreshorten which, together with the link 90, will pivot the rear frame 12 clockwise about the axes of the pins 52, 60 as the front frame 16 is pivoted counterclockwise about the axes of the pins 76 and 82. The extreme movement of the rear frame 12 and forward frame 16 relative to the center carriage 14 will cause the stops 132, 134 to abut each other thereby limiting further turning of the vehicle in that direction. Only two stops 132, 134 are needed between the front frame 16, carriage 14 and rear frame 12 since the link 90 will not permit the front frame 16 to turn relative to the carriage 14 once the stops 132, 134 engage each other. When the stops 132, 134 are in engagement, the vertical plane containing the axis of the pin 92 and the common axes of the pins 52 and 60 will have moved from the perpendicular position, previously described, to a position where the axis of the pin 92 will have subscribed an arc about the common axes of the pins 52, 60 so that the included angle between the perpendicular condition of the vertical plane and the end condition of the vertical plane will be defined by the angle "A" as shown in FIG. 2. At the same time, the vertical plane through the axis of the pin 94 and the axes of the pins 76 and 82 will have moved about the axes of the pins 76 and 82 so as to subscribe an equal acute angle with respect to the perpendicular condition of the vertical plane. When the vehicle is turned to the right, as viewed in FIG. 2, the stops 152 and 154 will abut in the extreme-most condition and the vertical plane through the axis of the pin 92 and the axes of the pins 52 and 60 will have swung to the opposite side of the vertical plane perpendicular to the axis of the link 90, only on the opposite side thereof. The same will be true for the vertical plane through the axes of the pin 94 and pins 76 and 82. In the most ideal condition, the total sweep of the vertical plane through the common axes of the pins 52,60 and 76,82, will be bisected by the perpendicular plane through said pivots and through the pins 92 and 94. In this way, the force between the link 90 and the front and rear frames 16 and 12 will be reasonably balanced. It has been found that the pivot pins 92,94 should not be located outside the quadrant formed by the axis lying perpendicular to the centerline 104 of the carriage 14 and said centerline 104 on the side of said perpendicular axis in which the pivot pin 92 or 94 is located.

With the link 90 rigidly pivoted the way it is shown and described, it is possible for one or the other of the rams 112 and 114 to leak or fail without causing failure of the steering of the vehicle. That is, assuming the ram 112 is inoperative, the ram 114 and the rigid link 90 will function together to create the same amount of turning as would be evident if both rams 112 and 114 were operative. The only difference is that an extra heavy load is placed on the operative ram 114. The point being, that failure of one ram will not cause the system to become inoperative, since the vehicle can still be steered and operated until appropriate repairs can be made.

FIGS. 4 and 5 illustrate the two extreme positions for turning of the vehicle. That is, in FIG. 4, the front and rear frames 16 and 12 have been turned to their limits for a left turn so that the vertical planes through the axes of the pivot pins 52 and 60 and 92 are extreme on one side of the vertical perpendicular plane. FIG. 5 illustrates the reverse condition with the vehicle turned to its maximum condition to the right wherein the vertical plane containing the axes of the pivots is on the opposite side of the perpendicular vertical plane. The link 90 being rigid and pivotally mounted as it is to the front and rear frames 16 and 12 on opposite sides of the centerline 104 of the vehicle, will force the front and rear frames 16 and 12 to pivot relative to the carriage 14 in equal degrees of rotation about the axes of the pivot pins 76,82 and 52,60.

Superimposed on the illustration of the vehicle, in FIG. 2, is a hydraulic circuit which is connected to the steering controls in the cab 36. The circuit entails a line 156 from the steering controls connected to the rod end 158 of ram 114 and connected to the head end 160 of the ram 112. Another line 162 from the steering controls is connected to the head end 164 of ram 114 and to the rod end 166 of ram 112. In this way, hydraulic fluid in one of the lines 156 or 162 from the system upon actuation of the steering controls in cab 36 will, for instance, pressurize the rod end 158 of ram 114 and the head end 160 of the ram 112 to foreshorten ram 114 and to elongate ram 112 thereby turning the vehicle to the left as viewed in FIG. 2. Similarly, pressurizing head end 164 of ram 114 and rod end 166 of ram 112 will turn the vehicle to the right.

We claim:
1. A double articulated vehicle comprising: a carriage having a longitudinal axis extending from the front to the rear thereof, a rear frame having a front wall pivotally connected to said carriage along a vertical axis intersecting said longitudinal axis of the carriage, a front frame pivotally connected to said carriage along a vertical axis intersecting said longitudinal axis of the carriage, a link connected to the rear frame for pivotal movement about a vertical axis located on one side of said longitudinal axis, said link being connected to the front frame for pivotal movement about a vertical axis located on the opposite side of said longitudinal axis, a first ram pivotally connected to the rear frame rearward of the front wall and to the rear of the carriage with both said connections being on the side of said longitudinal axis opposite from the connection of said link to said rear frame, a second ram pivotally mounted to the rear of the front frame and to the rear of the carriage with both said connections being on the side of said longitudinal axis opposite from the connection of said link to said front frame, and means for elongating one ram and shortening the other ram to articulate the front frame and rear frame relative to the carriage with the link transmitting movement from one frame directly to the other frame.

2. In a double articulated vehicle as claimed in claim 1 wherein said link is a rigid link with a longitudinal axis that intersects the longitudinal axis of the carriage at an acute angle.

3. In a double articulated vehicle as claimed in claim 1 wherein a pair of aligned stops are provided between one front corner of said rear frame and an aligned rear corner of said carriage and a second pair of aligned stops are provided between one front corner of the carriage and an aligned rear corner of said front frame.

4. In a double articulated vehicle as claimed in claim 1 wherein said pivotal connection between the rear frame and the carriage is comprised of a pair of vertically spaced apart, axially aligned pivot pins interfitting with overlapping flanges projecting, respectively, from said rear frame and said carriage, and wherein the pivotal connection between the carriage and the front frame is comprised of a pair of vertically spaced apart, axially aligned pivot pins interfitting with overlapping flanges projecting, respectively, from said carriage and said front frame.

5. A double articulated vehicle comprising: a rear frame, an intermediate carriage pivotally connected to said rear frame, a front frame pivotally connected to said carriage, a link connected to the rear frame for pivotal movement about a vertical axis located on one side of the pivotal connection between the rear frame and the carriage, said link being connected to the front frame for pivotal movement about a vertical axis located on the opposite side of the pivotal connection between the carriage and the front frame, a first ram pivotally mounted to the rear frame and to the carriage on one side of said link, one end of said first ram is connected to the rear frame rearward of a front wall of said rear frame with the other end of said ram being connected to the rear wall of said carriage, a second ram pivotally mounted to the front frame and to the carriage on the other side of said link, one end of said second ram is connected to a rear corner portion of said carriage with the other end being connected to the rear wall of the front frame, both said first and second rams being nested in recessed portions so as to be protected against random misuse from external forces, and means for elongating one ram and shortening the other ram to articulate the front frame and rear frame relative to the carriage with the link transmitting movement from one frame directly to the other frame.

6. In a double articulated vehicle as claimed in claim 5 wherein a cab is mounted on said carriage in overlapping relationship to said second ram to further protect said ram from misuse.

7. In a double articulated vehicle as claimed in claim 5 wherein said pivot connections at the ends of said link subscribing arcs about the respective pivot mountings between said front frame and said carriage and between said rear frame and said carriage when said vehicle is turned from one extreme to the other, said arcs being bisected by lines running perpendicular to the longitudinal axis of said link and passing through the pivotal mountings between the carriage and the front frame and between the carriage and the rear frame.

8. A double articulated vehicle comprising: a rear frame having an engine with a power takeoff shaft and a pair of vertically spaced apart, horizontally projecting flanges positioned above and below said takeoff shaft, an intermediate carriage having a power transmission shaft coupled to said power takeoff shaft and two sets of oppositely directed, vertically spaced apart, horizontally projecting flanges, a pair of vertically spaced apart, axially aligned pivot pins connecting one of said set of flanges to said pair of flanges for articulation of said carriage with respect to said rear frame, a front frame having a power takeoff shaft coupled to said transmission shaft and having a pair of vertically spaced apart, horizontally projecting flanges, a pair of vertically spaced apart, axially aligned pivot pins connecting said last-named flanges to said other set of projecting flanges on the carriage for articulation of the front frame with respect to said carriage, a link connected to the rear frame for pivotal movement about a vertical axis located on one side of the vertical axis of the pair of pivot pins between the rear frame and the carriage, said link being connected to the front frame for pivotal movement about a vertical axis located on the opposite side of the vertical axis of the pair of pivot pins between the carriage and the front frame, a ram pivotally mounted to the rear frame and to the carriage on vertical pivot axes which are on the side of the pivot pins between the rear frame and the carriage opposite to the pivot axis of the link, one end of said first ram is connected to the rear frame rearward of a front wall of said rear frame with the other end of said ram being connected to the rear wall of said carriage, a second ram pivotally mounted on the front frame and the carriage on vertical pivot axes which are on the side of the pivot pins between the front frame and the carriage opposite to the pivot axis of the link, one end of said second ram is connected to a rear corner portion of said carriage with the other end being connected to the rear wall of the front frame, both said first and second rams being nested in recessed portions so as to be protected against random misuse from external forces, and means for elongating one ram and shortening the other ram to articulate the front frame and rear frame about the pivot axes on the carriage so that both frames pivot toward the same side of the carriage.

9. In a double articulated vehicle as claimed in claim 8 wherein a cab is mounted on said carriage in overlapping relationship to said second ram to further protect said ram from misuse.

10. A double articulated vehicle comprising: a rear frame, an intermediate carriage having a longitudinal axis, means for pivotally mounting said carriage with respect to said rear frame about a vertical axis, a front frame, means for pivotally mounting said front frame with respect to said carriage about a vertical axis, rigid link means pivotally connected at one end to the rear frame and at the other end to the front frame, said link means having a longitudinal axis which crosses said longitudinal axis of the carriage at an acute angle longitudinal axis of the link lying perpendicular at one end to a line passing through said vertical axis of the pivotal mounting between the carriage and the rear frame and the pivotal connection between the link and the rear frame and said longitudinal axis of the link lying perpendicular at its other end to a line passing through said vertical axis of the pivotal mounting between the carriage and the front frame and the pivotal connection between the link and the front frame when the longitudinal axis of the rear frame, carriage and front frame are all aligned with each other, a ram having one end pivotally mounted to the rear frame and having the other end pivotally mounted to the carriage with both of said pivotal mountings being on one side of the longitudinal axis of the link means, a second ram having one end pivotally mounted to the front frame and having the other end pivotally mounted to the carriage with both of said pivotal mountings being on the opposite side of said longitudinal axis of the link means, and means for activating both rams to articulate the front frame and rear frame relative to the carriage so that both frames pivot toward the same side of the carriage.

11. In a double articulated vehicle as claimed in claim 10 wherein one of said rams is elongated as said other ram is foreshortened so as to turn one of said frames clockwise as said other frame is turned counterclockwise relative to said carriage.

12. A double articulated vehicle comprising: a rear frame, an intermediate carriage having a longitudinal axis, means for pivotally mounting said carriage with respect to said rear frame, a front frame, means for pivotally mounting said front frame with respect to said carriage, rigid link means pivotally connected at one end to the rear frame and at the other end to the front frame, said link means having a longitudinal axis which crosses said longitudinal axis of the carriage at an acute angle, a first ram having one end pivotally mounted to the rear frame and having the other end pivotally mounted to the carriage, one end of said first ram is connected to the rear frame rearward of a front wall of said rear frame with the other end of said ram being connected to the rear wall of said carriage, a second ram having one end pivotally mounted to the front frame, and having the other end pivotally mounted to the carriage, one end of said second ram is connected to a rear corner portion of said carriage with the other end being connected to a rear wall of the front frame, both said first and second rams being nested in recessed portions so as to be protected against random misuse from external forces, and means for activating both rams to articulate the front frame and rear frame relative to the carriage so that both frames pivot toward the same side of the carriage.

13. In a double articulated vehicle as claimed in claim 12 wherein said pivot connections at the ends of said link subscribe arcs about the respective pivot mountings between said front frame and said carriage and between said rear frame and said carriage when said vehicle is turned from one extreme position to the other extreme position, said arcs being bisected by lines running from the pivot mountings between the carriage and the respective frames and the pivot connections at the ends of said link when said front frame, said carriage and said rear frame are aligned along a common longitudinal axis.

14. In a double articulated vehicle as claimed in claim 12 wherein a cab is mounted on said carriage in overlapping relationship to said second ram to further protect said ram from misuse.

15. In a double articulated vehicle as claimed in claim 14 wherein a pair of aligned stops are provided between one front corner of said rear frame, and an aligned rear corner of said carriage and a second pair of aligned stops are provided between one front corner of the carriage and an aligned rear corner of said front frame.

16. A double articulated vehicle comprising: a carriage having a longitudinal axis extending from the front to the rear thereof, a rear frame pivotally connected to said carriage along a vertical axis intersecting said longitudinal axis of the carriage, a front frame pivotally connected to said carriage along a vertical axis intersecting said longitudinal axis of the carriage, a link connected to the rear frame for pivotal movement about a vertical axis located on one side of said longitudinal axis, said link being connected to the front frame for pivotal movement about a vertical axis located on the opposite side of said longitudinal axis, said pivot connections at the ends of said link subscribing arcs about the respective pivot mountings between said front frame and said carriage and between said rear frame and said carriage when said vehicle is turned from one extreme to the other, said arcs being bisected by lines running perpendicular to the longitudinal axis of said link and passing through the pivotal mountings between the carriage and the front frame and between the carriage and the rear frame, a first ram pivotally connected to the rear frame and to the carriage with both said connections being on the side of said longitudinal axis opposite from the connection of said link to said rear frame, a second ram pivotally mounted to the front frame and to the carriage with both said connections being on the side of said longitudinal axis opposite from the connection of said link to said front frame, and means for elongating one ram and shortening the other ram to articulate the front frame and rear frame relative to the carriage with the link transmitting movement from one frame directly to the other frame.

* * * * *

UNITED STATES PATENT AND TRADEMARK OFFICE
CERTIFICATE OF CORRECTION

PATENT NO. : 4,064,959

DATED : December 27, 1977

INVENTOR(S) : Robert N. Stedman and Gerald P. Simmons

It is certified that error appears in the above-identified patent and that said Letters Patent are hereby corrected as shown below:

Column 5, line 3, "an" should be --and--.

Column 8, line 61, after "angle" insert --, the--.

Signed and Sealed this

Twenty-fifth Day of April 1978

[SEAL]

Attest:

RUTH C. MASON
Attesting Officer

LUTRELLE F. PARKER
Acting Commissioner of Patents and Trademarks